Patented Mar. 5, 1935

1,993,181

UNITED STATES PATENT OFFICE 1,993,181

COMPOSITION OF FATTY MATTER AND PROCESS OF STABILIZING SAME

Albert S. Richardson, Wyoming, Ohio, Frank C. Vibrans, Chicago, Ill., and John T. R. Andrews, Cincinnati, Ohio, assignors to The Procter & Gamble Company, Cincinnati, Ohio, a corporation of Ohio No Drawing. Application August 5, 1932, Serial No. 627,618

11 Claims. (Cl. 87—12)

This invention relates to the treatment of oils, fats or fatty materials for the purpose of retarding oxidation and the accompanying changes.

It is well known that unsaturated vegetable and animal fats or oils are subject to gradual oxidation by air and that such oxidation tends to cause rancid odor and flavor.

It is also known that certain substances added in small proportions to oxidizable materials have the property of retarding oxidation. Such substances have been called anti-oxidants, or anti-oxygens; they have achieved extensive commercial use in rubber, but relatively little use in fats and fatty oils, especially those of edible grade. There is apparently no way of predicting what kinds of substances will protect any given oxidizable material although it has generally been believed that an anti-oxygen must be oxidized more easily than the material it protects.

We have made the surprising discovery that a certain group of substances not themselves oxidizable by air are active anti-oxygens when used in oils or fats and greatly delay the development of rancidity, even when present in amounts of less than one percent. This group consists of certain inorganic acids which contain stably bound oxygen (i. e. contain oxygen but are not strong oxidizing agents), together with their acid-reacting salts and esters. For instance, sulfuric acid and the various phosphoric acids have marked inhibiting action on the oxidation of fatty substances by atmospheric oxygen; whereas nitric acid and chloric acid are strong oxidizing agents and are not suitable for use in our invention. Likewise the acid phosphates and sulfates, either inorganic such as $KHSO_4$ and $NaH_2PO_4$ or organic such as glyceryl phosphoric acid, or the mixed acid reacting esters of glycerin with fatty and phosphoric acids, have valuable properties as anti-oxygens for fatty materials.

In addition to instances where small percentages of these acid anti-oxidants have a stabilizing effect on finished fatty products, our invention is useful for treating oils and fats which are exposed to air during storage and handling. If the presence of the acid-reacting substance in the finished product is objectionable, our invention may still be used for protection of oils and fats during storage, the free acid being eventually removed by alkali refining, water washing, or any other known means.

As examples of the effects of these materials, we cite the data in Table I. Fats with and without addition of the protective agents were spread on sand in small glass jars which were stored at constant temperature, the time to develop a distinctly rancid odor being noted as shown in the two columns at right of Table I. While the numerical results have no absolute significance and would vary, for instance, with the particular lot of sand used, the conditions of each experiment were so controlled as to make the values obtained indicative of relative keeping quality. The other numerical column of Table I shows the so-called incubation period of oxygen absorption by the same fatty oils when allowed to absorb atmospheric oxygen in closed flasks.

Table I

| Sample | Incubation period of oxygen absorption (hours) at 140° F. (average) | Days to become rancid | |
|---|---|---|---|
| | | 100° F. (Av.) | 120° F. (Av.) |
| Winterized cottonseed oil | 43 | 11 | 5 |
| Same, +0.2% ortho phosphoric acid | 175 | 31 | 12 |
| Same, saturated with ortho phosphoric acid | 306 | 68 | 26 |
| Winterized cottonseed oil +0.5% $NaH_2PO_4$ | | 17 | 6½ |
| Winterized cottonseed oil saturated with glycero-ortho-phosphate | 88 | 15 | 6 |
| Winterized cottonseed oil +0.5% conc. $H_2SO_4$ | 50 | over 18 | over 18 |
| Lard | | 11 | 5 |
| Lard +0.2% ortho phosphoric acid | | 13 | 5½ |

Further examples are given in Table II. Cottonseed oil with and without added protective agent was put in a thin layer in glass jars and incubated at 120° F.

Table II

| Sample | Days to become rancid at 120° F. |
|---|---|
| Winterized cottonseed oil (control) | 19 / 20 |
| Winterized cottonseed oil +.5% $NaHSO_4$ | 35 / 36 |
| Winterized cottonseed oil +.1% $NaHSO_4$ | 26 / 29 |
| Winterized cottonseed oil (control) | 24 / 24 |
| Winterized cottonseed oil +.5% $H_3BO_3$ | 27 / 28 |
| Winterized cottonseed oil +.5% $HPO_3$ (metaphosphoric acid) | 35 / 36 |

We are aware that phosphoric acid has been previously used to retard the bacterial spoilage of butter and that other materials of acid reaction have been similarly used to retard the bacterial decomposition of products containing moisture and protein and incidentally containing also fat, and we make no claim to any such process. The present invention is applicable to the retardation of oxidation or rancidity in substantially dry fatty materials which do not contain material subject to bacterial spoilage, but as hereinbefore explained, tends to become rancid as a result of atmospheric oxidation.

In the claims we use the term "acid salts" and the term "acid reacting esters". These terms are more or less based on usage. However, it should be made clear that in each case what is meant is that the salt or ester has an acid reaction. Salts or esters having a chemical structure of theoretically acid nature but without actually having an acid reaction are not a part of this invention.

Having thus described our invention, what we claim as new and desire to secure by Letters Patent, is:—

1. The process of stabilizing against rancidity due to oxidation unsaturated fatty materials which are substantially dry and substantially free from organic matter subject to bacterial decomposition, which comprises incorporating therewith a small quantity of a compound of the group of inorganic acid reacting substances containing stably bound oxygen consisting of sulfuric acid, the phosphoric acids, and their acid salts and acid reacting esters.

2. The process of stabilizing against rancidity due to oxidation unsaturated fatty materials which are substantially dry and substantially free from organic matter subject to bacterial decomposition, which comprises incorporating therewith a small quantity of a compound of the group of inorganic acid reacting substances containing stably bound oxygen consisting of sulfuric acid, the phosphoric acids, and their acid salts and acid reacting esters, and removing said compound from the fatty material prior to using the same.

3. The process of stabilizing against rancidity due to oxidation edible fats and oils which are substantially dry and substantially free from organic matter subject to bacterial decomposition, which comprises incorporating therewith a small quantity of a compound of the group of inorganic acid reacting substances containing stably bound oxygen consisting of sulfuric acid, the phosphoric acids, and their acid salts and acid reacting esters.

4. The process of stabilizing against rancidity due to oxidation unsaturated fatty materials which are substantially dry and substantially free from organic matter subject to bacterial decomposition, which comprises incorporating therewith a small quantity of any of the phosphoric acids containing stably bound oxygen.

5. The process of stabilizing against rancidity due to oxidation unsaturated fatty materials which are substantially dry and substantially free from organic matter subject to bacterial decomposition, which comprises incorporating therewith an acid reacting ester of phosphoric acid.

6. The process of stabilizing against rancidity due to oxidation unsaturated fatty materials which are substantially dry and substantially free from organic matter subject to bacterial decomposition, which comprises incorporating therewith an acid reacting ester of phosphoric acid with glycerine and fatty acid.

7. The process of stabilizing against rancidity due to oxidation unsaturated fatty materials which are substantially dry and substantially free from organic matter subject to bacterial decomposition which comprises incorporating therewith an inorganic acid phosphate.

8. Substantially dry edible fatty oil free from organic matter subject to bacterial decomposition, said fatty oil having incorporated therewith a small quantity of a compound of the group of inorganic acid reacting substances containing stably bound oxygen consisting of sulfuric acid, the phosphoric acids, and their acid salts and acid reacting esters, whereby the tendency to develop rancidity due to oxidation is lessened.

9. Substantially dry, edible fat free from organic matter subject to bacterial decomposition, said fat having incorporated therewith a small quantity of a compound of the group of inorganic acid reacting substances containing stably bound oxygen consisting of sulfuric acid, the phosphoric acids, and their acid salts and acid reacting esters, whereby the tendency to develop rancidity due to oxidation is lessened.

10. Lard stabilized against rancidity due to oxidation, said lard having incorporated therewith a small quantity of any of the phosphoric acids containing stably bound oxygen.

11. A winterized cotton seed oil having incorporated therewith a small quantity of any of the phosphoric acids containing stably bound oxygen.

ALBERT S. RICHARDSON.
FRANK C. VIBRANS.
JOHN T. R. ANDREWS.